United States Patent [19]
Yatka et al.

[11] Patent Number: 5,342,631
[45] Date of Patent: Aug. 30, 1994

[54] WAX-FREE CHEWING GUM INCLUDING SPECIAL OLIGOSACCHARIDE BINDERS

[75] Inventors: Robert J. Yatka, Orland Park, Ill.; Michael A. Reed, Merrillville, Ind.; Kevin B. Broderick, Berwyn, Ill.

[73] Assignee: Wm. Wrigley Jr. Company, Chicago, Ill.

[21] Appl. No.: 996,914

[22] Filed: Dec. 29, 1992

[51] Int. Cl.$^5$ .............................................. A23G 3/30
[52] U.S. Cl. ......................................... 426/3; 426/658
[58] Field of Search ................................ 426/3-6, 426/658

[56] References Cited

U.S. PATENT DOCUMENTS

| | | | |
|---|---|---|---|
| 2,782,123 | 2/1957 | Rubin | 426/658 |
| 3,161,524 | 12/1964 | Opie et al. | 426/658 |
| 3,766,165 | 10/1973 | Rennhard | 426/658 |
| 3,843,818 | 10/1974 | Wren et al. | 426/804 |
| 3,894,146 | 7/1975 | Tsuyama | 424/49 |
| 3,974,032 | 8/1976 | Harjés et al. | 426/658 |
| 3,984,574 | 10/1976 | Comollo | 426/4 |
| 3,996,389 | 12/1976 | Osborne | 426/654 |
| 4,359,531 | 11/1982 | Bucke et al. | 426/658 |
| 4,382,963 | 5/1983 | Klose et al. | 426/3 |
| 4,528,206 | 7/1985 | Kastin | 426/660 |
| 4,556,429 | 12/1985 | Takazoe et al. | 426/658 |
| 4,587,119 | 5/1986 | Bucke et al. | 426/3 |
| 4,587,125 | 5/1986 | Cherukuri et al. | 426/3 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,695,326 | 9/1987 | Takazoe et al. | 426/658 |
| 4,728,515 | 3/1988 | Patel et al. | 426/3 |
| 4,765,991 | 8/1988 | Cherukuri et al. | 426/3 |
| 4,786,722 | 11/1988 | Zehner | 426/658 |
| 4,792,453 | 12/1988 | Reed et al. | 426/5 |
| 4,802,924 | 2/1989 | Woznicki et al. | 426/302 |
| 4,902,674 | 2/1990 | Speights | 426/658 |
| 4,948,596 | 8/1990 | Bunick et al. | 426/3 |
| 4,961,935 | 10/1990 | Cherukuri et al. | 426/3 |
| 4,978,751 | 12/1990 | Biton et al. | 426/658 |

(List continued on next page.)

FOREIGN PATENT DOCUMENTS

| | | |
|---|---|---|
| 0252874 | 1/1988 | European Pat. Off. . |
| 0301628 | 2/1989 | European Pat. Off. . |
| 0325090 | 7/1989 | European Pat. Off. . |
| 0337889 | 8/1989 | European Pat. Off. . |
| 0351972 | 1/1990 | European Pat. Off. . |
| 0351973 | 1/1990 | European Pat. Off. . |
| 0390438 | 1/1990 | European Pat. Off. . |
| 0368451 | 5/1990 | European Pat. Off. . |
| 0397027 | 11/1990 | European Pat. Off. . |
| 0398465 | 11/1990 | European Pat. Off. . |
| 0438912 | 7/1991 | European Pat. Off. . |

(List continued on next page.)

OTHER PUBLICATIONS

Manual from the IBC USA Conferences, Atlanta, Georgia, Mar. 13, 1991.

Brochure entitled "Basic Properties of Fibersol-2" from Matsutani Chemical Co., Ltd.

*Primary Examiner*—Jeanette Hunter
*Attorney, Agent, or Firm*—Willian Brinks Hofer Gilson & Lione

[57] ABSTRACT

A petroleum wax-free chewing gum containing special noncariogenic oligosaccharides, sweeteners, and flavors is described. The noncariogenic oligosaccharides are preferably low calorie and act as binders when formulated into the wax-free chewing gums. The binder systems used contain at least 35 weight percent of the binder system as noncariogenic oligosaccharides, preferably including at least one from the group including polydextrose, fructooligosaccharides, indigestible dextrins, oligofructose, isomaltulose oligosaccharides, guar gum hydrolysates, hydrolyzed alginates, and hydrolyzed alkaloses, each noncariogenic oligosaccharide having an average Degree of Polymerization (DP) of at least 3, and preferably from 3 to about 50.

51 Claims, No Drawings

U.S. PATENT DOCUMENTS

| | | | |
|---|---|---|---|
| 4,980,177 | 12/1990 | Cherukuri et al. | 426/3 |
| 4,983,405 | 1/1991 | Cherukuri et al. | 426/3 |
| 4,987,124 | 1/1991 | Speights et al. | 426/658 |
| 5,009,900 | 4/1991 | Levine et al. | 426/96 |
| 5,032,579 | 7/1991 | Speights et al. | 426/658 |
| 5,039,530 | 8/1991 | Yatka et al. | 426/3 |
| 5,066,511 | 11/1991 | Cherukuri et al. | 426/658 |

FOREIGN PATENT DOCUMENTS

| | | |
|---|---|---|
| 0449594 | 10/1991 | European Pat. Off. |
| 0457098 | 11/1991 | European Pat. Off. |
| 2626583 | 8/1989 | France |
| 58-138355 | 8/1983 | Japan |
| 60-224449 | 11/1985 | Japan |
| 61-173748 | 8/1986 | Japan |
| 62-146562 | 6/1987 | Japan |
| 62-148496 | 7/1987 | Japan |
| 1-19860 | 4/1989 | Japan |
| 2-145169 | 1/1990 | Japan |
| 2-100695 | 4/1990 | Japan |
| 2-154664 | 6/1990 | Japan |
| 3-095102 | of 1991 | Japan |
| 3-20301 | 1/1991 | Japan |
| 3-47831 | 7/1991 | Japan |
| 3-47832 | 7/1991 | Japan |
| PCT/FI89/0-0142 | 8/1989 | PCT Int'l Appl. |
| PCT/US91/-07172 | 1/1991 | PCT Int'l Appl. |
| PCT/US92/-01686 | 6/1991 | PCT Int'l Appl. |
| PCT/US92/-09615 | 4/1992 | PCT Int'l Appl. |
| 2063268A | 6/1981 | United Kingdom |
| 2066639A | 7/1981 | United Kingdom |

WAX-FREE CHEWING GUM INCLUDING SPECIAL OLIGOSACCHARIDE BINDERS

FIELD OF THE INVENTION

The present invention relates to an improved wax-free chewing gum, and particularly to a new binder system for a wax-free chewing gum, which binder system includes special noncariogenic oligosaccharides.

BACKGROUND OF THE INVENTION

Waxes have traditionally been used in gum bases to present certain desirable characteristics in the resulting chewing gum product. Wax present in chewing gum bases and in chewing gums provides a number of functions in the gum base, for example, release of flavor, curing of the finished product, enhanced shelf life of the finished gum, and gum texture and softness.

Although the art contains teachings to wax-free gums, these gums typically provided different chew characteristics than those of gums created from wax-containing gum bases. Heretofore gum bases without wax, particularly petroleum waxes, were occasionally created to achieve specific ends, for example a non-tack gum. In these instances, compromises with respect to certain chewing gum characteristics, such as softness and chewability, may have been made to achieve other results such as non-tack or improved stability of certain ingredients. However, the art contains no teaching of how to achieve the desirable characteristics associated with wax, without using wax.

U.S. Pat. No. 3,984,574 issued to Comollo, discloses an abhesive chewing gum base in which the non-tack properties avoiding adhesion to dental work were achieved by eliminating conventional chewing gum base ingredients having tackiness and by substituting non-tacky ingredients therefore. Materials contributing to gum tackiness included certain elastomers, certain resins, and waxes. Comollo eliminated certain naturally occurring elastomers and substituted in their place one or more non-tacky synthetic elastomers such as polyisobutylene, polyisoprene, isoprene-isobutylene copolymer and styrene-butadiene copolymers. Comollo also eliminated tack-producing natural resins and modified natural resins and used instead relatively high amounts of hydrogenated or partially hydrogenated vegetable oils or animal fats. Finally, Comollo completely excluded waxes from his gum base, but in the place of wax included polyvinylacetate, certain fatty acids, and mono- and di-glycerides of fatty acids.

The Comollo product did present a non-tack chewing gum of commercial success. The product did not contain oligosaccharide binding ingredients, other than syrups and normal binding ingredients known to the art.

In U.S. Pat. No. 5,039,530, Yatka et al., a storage stable chewing gum incorporating alitame as a sweetener was disclosed. In one embodiment of this patent, formulations were presented substantially free of wax. Yatka's chewing gum also did not contain the special noncariogenic oligosaccharides of this invention as binding agents.

Also, a PCT Patent Application No. PCT/US92/01686, filed Mar. 3, 1992 in the U.S. receiving office, and entitled "Improved Wax-Free Chewing Gum Base", naming Steven Synosky as the inventor, and a later PCT Patent Application No. PCT/US92/09615, Synosky et al., discloses certain wax-free gum bases which attempted to relieve the negative perception created in the United Kingdom concerning the use of petroleum waxes in chewing gums. Additionally, a continuation in part of this PCT Patent Application, U.S. patent application Ser. No. 07/906,921, was later filed, which application taught improved wax-free gum bases and chewing gums made thereof; which teachings included the substitution of increased amounts of certain fats and oils to provide chewing gum characteristics lost by removing waxes. None of these applications, all of which are incorporated herein by reference, contained the oligosaccharides of this invention as a binding agent.

Since the removal of wax, particularly petroleum waxes, has caused the loss of desirable chewing gum characteristics such as softness and chewability, the art has sought a replacement to recover these characteristics. In addition, use of common binding agents such as corn syrup or the use of increased gum base levels were needed to improve the structure of the final product. In some cases this provided binding, but lost storage stability, and involved increased cost.

There was an obvious need for a method of removing wax from gum bases without compromising the characteristics of the resulting gum. Likewise there was a need for chewing gums which were wax-free, particularly petroleum wax-free and exhibited the characteristics of gums that included wax. Similarly, there was a need for processes and ingredient combinations that could provide wax-free gums and provide processing characteristics for these wax-free gums, which gums had the desirable characteristics of wax-containing gums.

SUMMARY OF THE INVENTION

The present invention is directed to a wax-free chewing gum which contains wax-free chewing gum bases, and certain binding ingredients or binder systems, which binders, or binding systems, contain at least 35 weight percent of at least one oligosaccharide having noncariogenic characteristics and which is poorly metabolized. By poorly metabolized, we mean that organisms involved in digestive studies derive less than, and often considerably less than, 2.3 calories per gram of ingested oligosaccharide. By noncariogenic we mean that the degree of tooth decay, or dental caries, is less than that observed with sucrose, dextrose, or corn syrup sweeteners. This can reflect the fact that the oligosaccharides are poorly utilized by streptococcus mutans, an organism found in the human mouth which can form plaque and acids, leading to caries.

These specialized noncariogenic oligosaccharides also have an average degree of polymerization ranging from at least 3 to about 50, or in some cases, as high as 100, and preferably are low-calorie oligosaccharides. Our specialized oligosaccharides preferably are formed from sugar bases, predominantly other than maltooligosaccharide bases.

These noncariogenic oligosaccharide binders may be combined with any wax-free gum base, particularly petroleum wax-free gum bases to provide for a chewing gum that is free of petroleum waxes, has high binding characteristics, has excellent chewability and also presents the optional opportunity to provide a low-calorie wax-free chewing gum with desirable processing and chew characteristics.

The gum base useful in the invention can include quantities of one or more elastomers, which elastomers may be synthetic, natural, or mixtures thereof. Additionally, the gum bases of the invention may include optional elastomer plasticizers, optional natural waxes and also include ingredients such as fillers, softeners, fats, oils, synthetics, colors, whiteners, antioxidants, and emulsifiers.

The present invention provides a petroleum wax-free gum retaining desirable characteristics of chewing gum having wax and also providing for binding characteristics which enhance processing and manufacturing as well as sensory properties of the chewing gum.

Our improved chewing gum is a petroleum wax-free chewing gum comprising a) a petroleum wax-free gum base;
b) a binder system, wherein the binder system comprises at least 35 weight percent of at least one noncariogenic oligosaccharide;
c) sweeteners, and
d) flavor ingredients.

Other optional ingredients may be added, and include, but are not limited to, bulking agents, synthetic softeners such as glycerin, emulsifiers, colors and whiteners, pharmaceutical agents, antioxidants, flavor enhancers, food acidulants, and the like.

In our petroleum wax-free chewing gums, the petroleum wax-free gum base comprises from about 10 weight percent to about 90 weight percent of the chewing gum composition, preferably from about 15 to about 75 weight percent, and most preferably from about to about 50 weight percent of the chewing gum.

The binder system described above comprises about 5 to about 90 weight percent of the chewing gum composition, preferably from about 10 to about 80 weight percent, and most preferably from about 15 to about 70 weight percent of the chewing gum composition.

The sweeteners are contained in the chewing gum composition from about 0.001 to about 70 weight percent, with sweetener selection and amount depending upon whether or not low-calorie, intermediate calorie, or normal calorie chewing gums are being formulated.

The flavor ingredients are contained in the gum from about 0.01 to about 10 weight percent, preferably from 0.05 to about 7.5 weight percent, and most preferably from about 0.1 to about 6.5 weight percent..

The optional ingredients listed above can be contained in the chewing gum from 0 to about 40 or more weight percent, preferably from about 0.01 to about 40 weight percent.

Preferably, the chewing gum of our invention contains a petroleum wax-free gum base which comprises:

a) elastomers making up from about 10 to about 90 weight percent of the gum base;
b) elastomer solvents or plasticizers making up from 0 to 50 weight percent of the gum base;
c) fats and oils, and/or other so-called softeners, making up from 1 to 40 weight percent of the gum base;
d) fillers and texturizers making up from 0.5 to 40 weight percent of the gum base;
e) certain vinyl polymers making up from about 0.5 to about 40 weight percent of the gum base; and
f) emulsifiers, colorants, whiteners, antioxidants or other miscellaneous ingredients making up from about 0.1 to about 5 weight percent of the gum base.

Also, certain natural waxes, such as beeswax and carnauba wax, may be used in our gum bases ranging from 0 to 5 weight percent of the gum base. Most preferably, our gum base contains no natural waxes.

As a person familiar with the art will recognize, the petroleum wax-free gum bases described above can be non-tack gum bases or can, in fact, be gum bases having some significant degree of tack to dental work surfaces and appliances. The chewing gums obtained by using the wax-free gum bases described above, with our selected binders, can be non-tack, tacky, high calorie, low calorie, and may be bubble gums, regular chewing gums, or specialty gums, for example those gums having perceived breath freshening qualities, or those gums containing certain pharmaceutical agents, such as, for example, aspirin.

The elastomer solvents or elastomer plasticizers that are present in the wax-free gum bases above are optionally present, but when present normally provide for some tackiness in the formulation. Similarly, natural waxes, when present in our petroleum wax-free gum bases may provide for certain tackiness, but also provide softness and chewability to our formulations.

When the goal for our petroleum wax-free chewing gums includes a low-calorie chewing gum, we prefer to replace any high-calorie bulking agents with low-calorie bulking agents and binders, such as the oligosaccharides used as binding agents in this invention. Merely increasing the amount of our specialized oligosaccharides, or combinations thereof, provides this benefit.

When the goal for the chewing gum does not include low-calorie chewing gums such that an intermediate or normal calorie product is desired, bulking agents such as sucrose, glucose, sorbitol, xylitol, and the like, and conventional binders such as hydrogenated starch hydrolysates, corn syrups, polyol syrups, and the like can be included in the formulations.

Because the petroleum wax-free gum base preferably contains no waxes, except for some possible use of certain relatively small quantities of natural waxes, or trace levels of petroleum waxes which may be added incidentally with other gum base ingredients, the chewing gum manufactured therefrom has a tendency in production to not bind the components later added to the gum base formulation. These components may comprise the sweeteners, bulking agents, flavor ingredients and certain of the optional ingredients as listed above. We have discovered that the use of certain oligosaccharides as binding agents, and more particularly the use of binding agents containing a prescribed minimum amount of these oligosaccharides, provides an advantage in the manufacture of and to the sensory characteristics of the final chewing gum product made using these oligosaccharide based binders.

THE BINDERS OF THE INVENTION

The binders, or the binder system, comprise at least 35 weight percent, by weight of the total binder system, of at least one noncariogenic oligosaccharide which is poorly metabolized in the human gut. The binder system preferably comprises from about 40 weight percent up to about 100 weight percent of at least one of these noncariogenic oligosaccharides.

In general, any noncariogenic oligosaccharide can be used in this invention. To be noncariogenic, the oligosaccharide has the characteristic of being poorly utilized by streptococcus mutans. Preferably, the binding agents are both noncariogenic and low-calorie oligosaccharide products. These noncariogenic oligosaccharides have an average Degree of Polymerization (DP) of at least 3, and preferably at least 5. Most preferably, the oligosaccharides useful in our binders have Degrees of Polymerization ranging from about 3 to about 50, perhaps as high as 100. The preferred noncariogenic oligosaccharides include the fructooligosaccharides, the indigestible dextrins, oligofructoses, isomaltulose oligosaccharides and polydextroses, but may also include certain guar gum hydrolysates, a polymer of mannose and galactose (about 2:1 mole ratio respectively), hydrolyzed alginates, certain other hydrolyzed gums or hydrolyzed cellulosics having an average degree of polymerization of at least 3, and preferably an average degree of polymerization of at least 5. Degree of Polymerization is the number of repetitive sugars, either the same or different sugars, or their residues present in the oligosaccharide. An average Degree of Polymerization is a number average of all such oligosaccharides in a particular population of oligosaccharides.

The specialized noncariogenic oligosaccharides of our invention most preferably are those having repeating sugar bases which are not, or at least predominantly not maltooligosaccharides having the so-called α1,4 dextrose-dextrose repeating sugar linkages.

One such noncariogenic oligosaccharide is oligofructose, an inulin-oligosaccharide. Oligofructoses are oligosugars primarily containing repetitive fructose units bonded to each other, often with at least one glucose molecule attached at the end. Inulin or oligofructoses belong to the group of poly- or oligofructoses which are naturally occurring in about 30,000 different plant species. After starch, the fructose based polysugars are the most abundant non-cellulosic carbohydrate.

Inulin is a long chain oligofructose found in many plant species. After extraction inulin may be hydrolyzed enzymatically to lower molecular weight carbohydrates, which are the inulin oligosaccharides. Both inulin and inulin oligosaccharides, and admixtures thereof, are useful as the oligofructoses of this invention.

Oligofructose agents are not yet approved for use in human food products or in chewing gum in the United States, but a pending GRAS status has been achieved. In Belgium, Luxembourg, France, The Netherlands, Denmark and Japan, oligofructose is already considered a foodstuff. Although a sugar, oligofructose may not contribute significantly to dental caries, contributes to dietary fiber, and does not significantly contribute to calories. Thus, this ingredient's use in the wax-free chewing gums of this invention is a definite improvement.

U.S. Pat. No. 3,894,146 discloses a coupling sugar called oligoglucosyl fructose derived from other sugars.

Fructosyl oligomers and oligosaccharides are disclosed in U.S. Pat. No. 4,978,751, EPO Patent Publication No. 0 301 628 and EPO Patent Publication No. 0 337 889.

Oligofructose type of fructose compounds were first disclosed in U.S. Pat. No. 2,782,123. The material was useful as a bulk sweetener and may be obtained from Jerusalem artichoke tubers which contain significant amounts (5–20%) of inulin. Also disclosed is the inulin treated by acid hydrolysis.

Another company, Raffinerie Tirlemontoise SA, has developed an oligofructose from chicory root, which also contains about 5–20% inulin. The naturally occurring inulin is extracted from the root, purified, and dried. This product has the trade name Raftiline. A lower molecular weight material, called Raftilose, is made by enzymatic hydrolysis of Raftiline.

Another noncariogenic oligosaccharide useful in the binding agents of our invention includes a material referred to as polydextrose. Polydextrose provides bulking capabilities as well as binding capabilities in our formulations. This polydextrose binding agent is approved for using in human food products and in chewing gums in the United States and also in countries in Europe and Japan. Polydextrose is a randomly bonded condensation, or a recombined, polymer of dextrose containing minor amounts of bound sorbitol and citric acido Although referred to as a carbohydrate, polydextrose does not contribute to dental caries and does not cause as significant gastrointestinal disturbances as polyols, and finally does not significantly contribute to calories.

In 1973, Pfizer, Inc. of New York disclosed the manufacture of unique polyglucose compounds (polydextrose) compounds and their method of preparation in U.S. Pat. No. 3,766,165.

The use of polydextrose has been disclosed in various food products in EPO Patent Publication No. 0 438 912, U.S. Pat. No. 4,802,924, U.S. Pat. No. 4,528,206 and U.S. Pat. No. 5,009,900.

The use of polydextrose has also been disclosed in chewing gum formulations in EPO Patent Publication No. 0 252 874, U.S. Pat. No. 4,765,991, EPO Patent Publication No. 0 398 465, U.S. Pat. No. 5,066,511, Japanese Patent Publication No. 86 173748 and U.S. Pat. No. 4,382,963.

When polydextrose was first introduced into the market, the product had poor flavor quality. As a result, several patents disclosed methods of improving its quality. These are Japanese Patent Publication No. 91 020301 and U.S. Pat. No. 4,948,596.

Pfizer, Inc. of New York has recently introduced a premium version of polydextrose that has improved flavor quality and is marketing its polydextrose under the tradename "Litesse."

Another noncariogenic oligosaccharide useful as a binding agent in our invention is referred to as indigestible dextrin, These indigestible dextrins, varieties of which are sold under the trade name Fibersol, have recently obtained a GRAS rating from the United States Food and Drug Administration. This material is approved for use in Japan.

Although a carbohydrate, indigestible dextrin does not contribute to dental caries, i.e. is noncariogenic, does not cause gastrointestinal disturbances and does not contribute to calories. Thus, this ingredient's use as a binder in chewing gum could be a definite improvement.

The manufacture of indigestible dextrin is disclosed in EPO Patent Publication No. 0 368 451, and its method of preparation is disclosed in other related patents. These are Japanese Patent Applications NOS. 02/100695; 02/145169; 02/154664; 91-047831 and 91-047832.

Additional information is supplied by a brochure from Matsutani Chemical Industry Co., Ltd. of Japan, titled "Basic Properties of Fibersol-2." Fibersol is a tradename for Matsutani Company's illdigestible dextrin product.

A similar type material, starch hydrolysate dextrin, is disclosed in U.S. Pat. No. 3,974,032. The product is a low DE starch hydrolysate of improved stability prepared by enzymatic hydrolysis of dextrins.

Yet another noncariogenic oligosaccharide is palatinose, a product available from Palatinit Sussungsmittel G.m.b.H., a German company. Palatinose may also be referred to as isomaltulose, a generic description of this product. Palatinose or isomaltulose is a reducing disaccharide with an α1,6 bond between glucose and fructose. This bulking agent is not approved for use in food products in the United States at the present time, but is being considered by the U.S. FDA for GRAS affirmation. This material is approved for use in Japan and is being used in chewing gum there. Although technically an oligosugar, isomaltulose does not contribute to dental caries, i.e. is noncariogenic, nor does it cause gastrointestinal disturbances, and the use of this ingredient provides for definite improvements in chewing gums.

Preferably, the isomaltulose oligosaccharides, that is, those polyisomaltuloses having a degree of polymerization of at least 3, may be selected as the binding agents of this invention. These isomaltulose oligosaccharides are also available commercially and are referred to as palatinose oligosaccharides, or POS. POS, on a dry solids basis, is 48% palatinose and 50% oligosaccharides based on palatinose repolymerization with citric acid. POS is also noncariogenic.

The manufacture of isomaltulose is disclosed in UK Patent No. 2,063,268, Japanese Patent No. 87-148496, and U.S. Pat. No. 4,359,531.

UK Patent No. 2,066,639 discloses the replacement of sucrose with isomaltulose in various food type products.

Combinations of isomaltulose with highpotency sweeteners are disclosed in EPO Publication No. 0,390,438 (using sucralose) and Japanese Patent No. 83-138355 (using aspartame).

Results of cariogenic studies of isomaltulose are disclosed in U.S. Pat. Nos. 4,556,429, 4,587,119 and 4,695,3260 Isomaltulose inhibits the formation of insoluble glycan from sucrose and thus reduces dental plaque.

The use of isomaltulose in chewing gum is disclosed in Japanese Patent No. 89-019860.

Other patents disclose how bulking agents may be used in chewing gum to modify texture, flavor, caloric and shelf life properties.

For example, U.S. Pat. No. 4,983,405 discloses the method of adding bran fiber to chewing gum to reduce calories.

U.S. Pat. No. 4,980,177 discloses a high gum base, low bulking agent composition giving a low caloric, saliva stimulating chewing gum using sodium carboxymethyl cellulose carrier.

U.S. Pat. No. 4,961,935 discloses a composition of anhydrous chewing gum containing a non-hygroscopic bulking agent called Palatinit ®, which is hydrogenated isomaltulose. Palatinit is a registered tradename of Palatinit Sussungsmittel G.m.b.H.

U.S. Pat. No. 4,786,722 discloses D-Tagatose as a naturally occurring bulking agent for use in chewing gum.

U.S. Pat. No. 4,765,991 discloses the use of polydextrose with a PVA base in a reduced calorie chewing gum. U.S. Pat. No. 4,382,963 discloses polydextrose used in chewing gum with snack type flavors.

PCT Publication No. 90-006317 discloses the use of crystalline lactitol monohydrate sweetener as a sugar replacement for dietetic foods, including chewing gum.

EPO Publication Nos. 0,351,972 and 0,351,973 disclose the use of sweet and non-sweet bulking agents in a savory, meat-like flavored chewing gum.

EPO Publication No. 0,325,090 discloses a sugarless anhydrous chewing gum containing maltitol.

As many U.S. patents and other patent applications are presented above, the use of isomaltulose oligosaccharides, i.e., palatinose oligosaccharides or POS, or hydrolyzed and/or hydrogenated isomaltulose oligosaccharides, or hydrolyzed or hydrogenated POS, in chewing gums does not appear to be disclosed as a binding agent in a wax-free gum formulation.

Another noncariogenic oligosaccharide is known as the fructooligosaccharide, or FOS. The difference between FOS and inulin oligosaccharides is that FOS is made by enzymatically adding fructose molecules to a sucrose molecule to obtain FOS, whereas inulin oligosaccharides are based on inulin from plants, wherein the inulin is hydrolyzed or broken down to smaller degrees of polymerization, hence lower molecular weight oligofructoses.

Fructooligosaccharides (FOS) are disclosed in U.S. Pat. Nos. 4,902,674; 4,987,124; and 5,032,579 as a method and composition for inhibiting the growth of Salmonella. Fructooligosaccharides are also disclosed in EPO Patent Publication No. 0 397 027 and Japanese Patent No. 3-095102 in a method for killing pests. U.S. Pat. No. 4,681,771 discloses a low caloric, low cariogenic sweetener comprising oligosaccharides having from 1 to 4 molecules of fructose bound to sucrose. The use of the sweetener in chewing gum is described. The patent is assigned to the Japanese firm of Meiji Seika Kaisha, who have joined forces with Coors Biotech, Inc. to manufacture and market a FOS product under the tradenames Neosugar, or NutraFlora.

PCT Application Serial No. PCT/US91/07172, filed Sep. 30, 1991, discloses the use of fructooligosaccharides (FOS) in chewing gums, but does not contemplate the use of petroleum wax-free bases in these chewing gums.

Fructooligosaccharide is a binding agent having bulking capabilities and some bulk sweetener capabilities but as of this filing is not approved for use in human food products or chewing gum in the United States. A GRAS affirmation petition for FOS is being prepared and the bulk product is approved for use in Japan and is being used in a variety of foods. Although technically a sugar, FOS does not contribute to dental caries, does not cause as significant gastrointestinal disturbances as the polyols and does not significantly contribute to calories.

FOS is used in Japan as a sweetening agent, flavor enhancer, bulking agent and humectant. The product is also added to Japanese "health foods" to promote the growth of "beneficial" bacteria in the lower gastrointestinal tract.

Another special oligosaccharide useful as binding agents in our wax-free chewing gums comprises Guar Gum Hydrolysate (GGH). This binder is not approved for use in human food products or in chewing gum in the U.S. However, a GRAS affirmation petition for GGH as a human food ingredient is currently being prepared. The bulk sweetener is approved for use in Japan and is being used in a variety of foods. Although a sugar, GGH does not contribute to dental caries, does not cause as significant gastrointestinal disturbances as polyols and does not significantly contribute to calories. Thus, this ingredient's use in chewing gum could also be a definite improvement.

Guar gum, which is found in the seeds of two leguminous plants, has found extensive uses as a food additive. U.S. Pat. No. 3,843,818 discloses low caloric pastas made with guar gum. In U.S. Pat. No. 3,996,389, guar gum has been used as a stabilizer for ice cream, ice milk and sherbet. Culinary mixes containing guar gum are disclosed in U.S. Pat. No. 3,161,524. A process for producing low odor, low taste guar gums useful in foods is described in U.S. Pat. No. 3,455,899. Use of guar gum in chewing gum is disclosed in Japanese Patents Nos. 85-224449 and 87-146562.

Guar gum is a high molecular weight polysaccharide which, when dissolved in water, forms very high viscosity solutions or gels at low concentrations. Due to the molecular weight and resulting high viscosity aqueous solutions, guar gum has found only limited utility as a bulking agent for food.

In order to make guar gum more suitable for foods, it needs to be hydrolyzed to obtain a guar gum hydrolysate. A guar gum hydrolysate made by acid hydrolysis and its use in foods is disclosed in EPO 0 449 594. An enzymatically hydrolyzed guar gum is described at a seminar given by IBC USA Conferences, Inc. (International Business Communications in Atlanta, Georgia on Mar. 13–14, 1991). Information on guar gum hydrolysate is disclosed in the manual from the seminar and is available from IBC USA Conferences, Inc., 8 Pleasant Street, Bldg. D, South Natick, Mass.

An enzymatically hydrolyzed guar gum is produced by Taiyo Kagaku Coo, Ltd. and is being marketed in the U.S. by Sandoz Nutrition Corp. of Minneapolis, Minn. under the trade name Sunfiber or Benefiber. Sunfiber has been described as a copolymer of mannose and galactose having an average molecular weight about one-tenth that of the starting guar gum. The ratio of mannose to galactose is about 2:1 in the Sunfiber product. To obtain the product, Sunfiber, guar gum is hydrolyzed by the enzyme $\beta$, D-mannanase from *Aspergillus niger*, is refined by activated carbon, sterilized, and spray dried. Sunfiber is a white powder, soluble in cold water, and the solution is colorless, transparent, and almost sweetless. Viscosity of Sunfiber solution is much lower than guar gum. A viscosity of 10% Sunfiber solution is about 10 cps, as compared to 3,000 cps of a 1% guar gum solution.

Each of the patents and patent applications, articles and booklets, cited above are incorporated herein by reference.

DETAILED DESCRIPTION OF THE PRESENTLY PREFERRED EMBODIMENTS

In accordance with the invention, a chewing gum base and a chewing gum which are both free of petroleum waxes is provided for use in either a non-tack or a conventional chewing gum, which gum may be either a bubble gum, a specialty gum, or a regular chewing gum.

THE PETROLEUM WAX-FREE GUM BASE

The gum base useful in manufacturing the chewing gums of the invention contains from 10 to 90 weight percent elastomers, preferably from about 15–75 weight percent elastomers. The gum bases also contain from 0 to 50 weight percent elastomer solvent or elastomer plasticizers, preferably from about 0–40 weight percent; and from 1 to 40 weight percent fats and oils, preferably from about 5–30 weight percent, and/or other softeners. The gum bases also contain from 0.5 to 40 weight percent fillers and/or texturizers, preferably from about 1.0–30.0 weight percent fillers, and from 0.5 to 40 weight percent vinyl polymers, preferably about 1–30.0 weight percent vinyl polymers, and from 0.1 to 5 weight percent emulsifiers, colorants, whiteners, antioxidants or other miscellaneous ingredients, preferably about 0.5–3.5 weight percent of these ingredients. The gum base may optionally contain from 0 to 5 percent natural waxes, and preferably from 0–3.5% natural waxes. Most preferably, natural waxes are not used.

In the gum base above, no petroleum waxes are used. When natural waxes are optionally used, they are used in relatively low concentrations, normally not exceeding 5 weight percent of the gum base.

The elastomers that can be used in our wax-free gum bases include, but are not limited to, synthetic elastomers such as styrene-butadiene copolymers, polyisoprene, polyisobutylene, isobutyleneisoprene copolymer, sometimes referred to as butyl elastomer, and natural elastomers or rubbers, such as smoked or liquid latex, guayle, perillo, nispevo, rosindinha, chiquibal, Crown gum, dendare, niger gutta, tunu, chilte, chicle, jelutong, balata, guttapercha, lechi caspi, sorva, or mixtures and/or blends thereof. Preferably the elastomers are selected from synthetic elastomers such as styrene- butadiene copolymers having a mole ratio of styrene to butadiene ranging between 3:1 to 1:3 and a weight average molecular weight ranging from about 10,000 to about 200,000. The elastomer can also be polyisoprene having a weight average molecular weight ranging from about 10,000 to about 200,000, polyisobutylene having a weight average molecular weight ranging from about 10,000 to about 200,000, isobutylene isoprene copolymer having a mole ratio of isobutylene to isoprene ranging from about 20:1 to about 1:20 and a weight average molecular weight ranging from about 10,000 to about 100,000 or mixtures of these synthetic elastomers. The elastomers may be blended in the same gum base, or in different gum bases which are then mixed to form our chewing gum products.

The synthetic elastomers may also be blended with other synthetic elastomers or with natural elastomers as listed above.

Our wax-free gum bases may optionally contain an elastomer solvent, sometimes referred to as an elastomer plasticizer, of from 0 to 50 weight percent of the total gum base composition. These elastomer plasticizers may include, but are not limited to natural resin esters such as the glycerol esters of partially hydrogenated resins, the glycerol esters of polymerized resin, the glycerol esters of partially hydrogenated resin, the glycerol esters of resin, the pentaerythritol esters of partially hydrogenated resins, methyl and partially hydrogenated methyl esters of resin, pentaerythritol esters of resin; and synthetic plasticizers such as terpene resins derived from alpha pinene, beta pinene, and/or d-limonene; and any suitable combinations of these materials. The preferred elastomer plasticizer is also very dependent on the specific application and on the type of elastomer which is used. For example, the terpene resins used either entirely or in part to replace ester gums cause most gum bases to become less tacky.

The fats and oils or other softeners and emulsifiers used in the invention may include tallow, hydrogenated tallow, hydrogenated and partially hydrogenated vegetable oils, cocoa butter, glycerol monostearate, glycerol triacetate, lecithin, mono-, di-, and tri-glycerides, acetylated monoglycerides, fatty acids including but not limited to stearic acid, palmitic acid, oleic acid, linoleic acid, lauric acid, myristic acid, arachidic acid, linoleic acid, caproic acid, caprylic acid, butyric acid, decenoic acid, gadoleic acid, or mixtures thereof. Often simple methyl or ethyl esters, or pentaerythritol esters of these fatty acids may also be used. Hydrogenated vegetable oils are generally preferred either alone or in combination with other fats and oils or softeners and are present in the formulation at least in part to compensate for the removal of petroleum waxes.

Other synthetic softeners may also be added and are included in the fatty and oil portion of the above formulation. The synthetic softeners can include, but are not limited to, glycerin, glycerol triacetate, acetylated monoglycerides, and the like.

Our wax-free gum base also contains fillers or texturizers. These fillers or texturizers are present within the range of about 0.5 to 40 weight percent, preferably from 1.0 to 25.0 weight percent and are selected from water insoluble organic or inorganic compounds such as, but not limited to, calcium carbonate, ground limestone, magnesium silicate, aluminum silicate, silicas, aluminas, talc, titanium dioxides, mono-, di- and tri-calcium phosphates, cellulosics, and clays. These fillers or texturizers may also be used in combination one with the other as described above.

Our wax-free gum bases may also contain vinyl polymers which vinyl polymers are present within the range of 0.5 to 40 weight percent, preferably within the range of 1.0 to 30 weight percent, and most preferably between the range of 2.0 and 20 weight percent. These vinyl polymers are primarily represented by polyvinylacetate, partially hydrolyzed polyvinylacetate, polyvinyl alcohols, and copolymers of vinyl acetate and vinyl laurate, or any admixture thereof. The polyvinylacetates and partially hydrolyzed polyvinylacetates normally have a weight average molecular weight ranging from about 2,000 to about 100,000, and the copolymers of vinyl acetate and vinyl laurate normally have an average molecular weight ranging from about 1,000 to about 100,000. When partially hydrolyzed polyvinylacetates are used, the degree of hydrolysis ranges from about 10 percent to about 90 percent, preferably between about 20 percent to about 80 percent. When copolymers of vinylacetate and vinyl laurate are used, they normally contain a vinyl laurate content ranging from about 5 to about 50 weight percent of the copolymer, and they preferably have a weight average molecular weight ranging from about 2,000 to about 80,000. In addition to the vinyl polymers mentioned above, the vinyl polymers can also include polyethylenes, polypropylenes, or polybutylenes having a weight average molecular weight ranging from about 1,000 to about 50,000, although these materials are normally sparingly used, and when used are preferably used in combination with the other vinyl polymers above.

Colorants and whiteners may include FD&C type dyes and lakes, fruit and vegetable extracts, titanium dioxide, cocoa powder, or combinations thereof.

When natural waxes are used in our formulation, they are normally selected from the group consisting of candelilla wax, carnauba wax, ozoberite, oricury, beeswax, rice bran wax, Japan wax, and jojoba wax. Other natural waxes can also be used in combination with the above or by themselves. The above listed waxes may also be used in combination one with the other or in multiple combinations if needed. Preferably, the waxes are formulated within the gum base at about 0.0 weight percent to about 3.5 weight percent of the gum base, using at least one natural wax from the group above. Most preferably, no natural waxes are used.

The petroleum wax-free gum bases most preferably contain from 15 to 75 weight percent elastomer, from 0 to 40 weight percent elastomer plasticizer, from 5 to about 30 weight percent fats, oils and softeners, from 2.0 to 20 weight percent fillers and texturizers, from 2o0 to 20 weight percent vinyl polymers, from 0.5 to 3.5 weight percent emulsifiers, colorants, whiteners and antioxidants, and from 0.0 to 3.5 weight percent natural waxes.

THE PETROLEUM WAX-FREE CHEWING GUMS

The petroleum wax-free gum bases are used to manufacture our wax-free chewing gums. In the wax-free chewing gum formulation, the petroleum wax-free gum base is blended with a binder system where the binder system comprises at least 35 weight percent by weight of the total binder system of at least one noncariogenic oligosaccharide, as described in detail above, and with sweeteners and flavor ingredients. The oligosaccharides are preferably both noncariogenic and poorly metabolized, which means the oligosaccharides contribute less than and often significantly less than 2.3 calories/grams of oligosaccharides to the metabolizing organism, including but not limited to streptococcus mutans, an organism involved in producing caries. Other optional ingredients and materials may also be added. Preferably, our chewing gums contain from 15–75% gum base and from 10–80% of the binder system, where the binder system is from about 40–100 weight percent of the noncariogenic oligosaccharide binders of this invention.

Our petroleum wax-free chewing gum may also contain, and be manufactured by using other binder ingredients such as Lycasin ®[1], or Hydrogenated Starch Hydrolysate, HSH, corn syrups, and the like. The use of these other binders are known in the art, but when used in our formulations these other binders are used within the definition of the binder system which contains our noncariogenic oligosaccharides. This requires from as little as about 0 and up to about 65 weight percent, at most, of the binder formulation being the other binders, such as the Lycasin ® HSH materials, corn syrups and the like, or mixtures thereof.

[1] Lycasin ® is registered trademark of Roquette-Fréres of France.

The sweeteners that we use can be highintensity sweeteners or can be low-intensity sweeteners such as the more traditional sugars, sugar alcohols and the like.

The high-intensity sweeteners are represented by, but not limited to, sucralose, aspartame, stevioside, acesulfame K, alitame, saccharin and its salts, cyclamic acid and its salts, glycyrrhizin, dihydrochalcones, thaumatin, monellin, and the like. These high-intensity sweeteners are at least 20 times sweeter than sucrose. They may be used alone or in combination one with the other, or may be used in combination with other low-intensity sweeteners, such as the sugar and sugar alcohol sweeteners.

The sugar or sugar alcohol sweeteners, sometimes referred to as low-intensity or bulk sweeteners, may also be used in the formulations of our wax-free gums. These bulk sweeteners may include both sugar and sugarless sweeteners and components. Sugar sweeteners include saccharides such as, but not limited to, sucrose, dextrose, maltose, dry invert sugar, fructose, levulose, galactose, corn syrup solids, and the like. These materials may be used alone or in combination one with the other, or in combination with the high-intensity sweeteners above, or with the sugarless sweeteners below, or both.

Sugar alcohols have sweetening characteristics but are devoid of cariogenic properties of commonly known sugars and are more slowly metabolized. Such sugar alcohols include, but are not limited to, sorbitol, mannitol, xylitol, hydrogenated starch hydrolysates, maltitol, and the like. Again these may be used alone or in combination with normal sugar sweeteners or bulking agents and/or with the highintensity sweeteners above. Combination of these sugars, sugar alcohols, and high-intensity sweeteners may be used in our chewing gums. These sweeteners, particularly the sugars and sugar alcohols, may also function in the chewing gum in whole or in part as water-soluble bulking agents.

When our chewing gums contain sweeteners selected from only high-intensity sweeteners, these high-intensity sweeteners are normally present within the range of 0.001 to 2 weight percent, preferably within the range of 0.002 to 1 weight percent, and most preferably within the range of 0.005 to 0.75 weight percent of the gum formulation. Bulk sweeteners, either the sugar or sugar alcohol sweeteners, when used in combination with high-intensity sweeteners may be present in the gum formulations within the range of 0 to 70 weight percent, preferably from 0.0 to 50 weight percent and most preferably from 5.0 to 40 weight percent.

Our chewing gums may also contain optional ingredients such as synthetic softeners, represented for example by glycerin, with concentrations ranging from about 0 to 15 weight percent, preferably from 1.5 to 10 weight percent, and additional fillers, emulsifiers, colors and antioxidants. In addition, our chewing gums can contain miscellaneous ingredients such as flavor enhancers, pharmaceuticals and food acidulants as well as bulking agents, both sweet bulking agents and non-sweet bulking agents.

Finally, our chewing gums contain flavoring agents, generally in the range of from about 0.01 to about 10 weight percent, preferably from about 0.1 to about 7.5 weight percent and most preferably from about 0.2 to about 6.5 weight percent. These flavor ingredients can include, but are not limited to, essential oils, synthetic flavors or mixtures thereof, including oils derived from plants and fruits, such as citrus oils, fruit essences, peppermint oil, spearmint oil, other mint oils, clove oil, oil of wintergreen, anise, and the like. Artificial or synthetic flavoring agents and components may also be used. Natural and artificial flavoring agents may be combined in any sensorially acceptable fashion.

To better exemplify our petroleum wax-free chewing gum, we present the following gum base formulations. These gum bases are useful in our invention, but our invention is not limited to the use of the exemplified gum bases:

EXAMPLES 1-6

| GENERIC INGREDIENTS | IDENTIFICATION - EXAMPLE #: | | | | | |
|---|---|---|---|---|---|---|
| | 1 | 2 | 3 | 4 | 5 | 6 |
| NATURAL ELASTOMER | | | | | | |
| NATURAL GUM | | | | | | 22.2 |
| SYNTHETIC ELASTOMER | | | | | | |
| STYRENE-BUTADIENE ELASTOMER | — | 3.9 | — | — | — | — |
| BUTYL (ISOPRENE-ISOBUTYLENE) ELASTOMER | 8.1 | 5.3 | 8.9 | 10.0 | 8.3 | 5.7 |
| POLYISOBUTYLENE ELASTOMER | 3.6 | 12.7 | 10.0 | 1.9 | 3.6 | 3.1 |
| POLYVINYL ACETATE | 27.3 | 14.9 | 21.3 | 27.6 | 27.5 | 22.0 |
| ELASTOMER PLASTICIZERS | | | | | | |
| GLYCEROL ESTERS OF ROSIN | — | — | — | — | — | — |
| GLYCEROL ESTERS OF PART HYD ROSIN | — | — | — | — | — | 13.2 |
| METHYL ESTERS OF ROSIN | | | | | | 2.0 |
| TERPENE RESINS | 26.8 | 21.4 | 9.7 | 25.3 | 25.3 | — |
| FILLER | | | | | | |
| CALCIUM CARBONATE | 11.4 | 13.7 | 21.5 | 11.3 | 11.3 | 11.3 |
| TALC | — | 1.4 | — | — | — | — |
| SOFTENER | | | | | | |
| HYDROGENATED VEGETABLE OIL | 14.3 | 18.7 | 23.2 | 15.4 | 16.5 | 17.2 |
| GLYCEROL MONOSTEARATE | 4.8 | 5.7 | 5.4 | 4.8 | 4.8 | 3.3 |
| LECITHIN | 3.7 | 2.3 | — | 3.7 | 2.7 | — |
| TOTAL PERCENT | 100.0 | 100.0 | 100.0 | 100.0 | 100.0 | 100.0 |

The above petroleum wax-free gum bases may then be used to formulate the following wax-free chewing gums with the binders of our invention.

EXAMPLES—WAX-FREE CHEWING GUMS

| Ex. 1 (inventive) | Ex. 1 (inventive) | Ex. 2 (comparative) |
|---|---|---|
| Gum Base of Example 1* | 23.00 | 23.00 |
| Sucrose | 52.94 | 60.94 |
| Corn Syrup | 12.00 | 12.00 |
| Indigestible Dextrin (Fibersol) | 8.00 | — |
| Peppermint Flavor | 1.00 | 1.00 |
| Glycerin | 3.00 | 3.00 |
| Color | 0.06 | 0.06 |
| | 100.00 | 100.00 |

Gum of Ex. 1 will be more flexible, and more easily processed than that of Ex. 2.

| | Ex. 3 (inventive) | Ex. 4 (comparative) |
|---|---|---|
| Gum Base of Example 6 | 24.00 | 24.00 |
| Sorbitol | 53.00 | 59.00 |
| Glycerin | 4.00 | 4.00 |

-continued

|  | Ex. 3 (inventive) | Ex. 4 (comparative) |
|---|---|---|
| Mannitol | 6.00 | 6.00 |
| Hydrogenated Starch Hydrolysate Syrup | 6.00 | 6.00 |
| Fructooligosaccharide (NutraFlora) | 6.00 | — |
| Spearmint Flavor | 0.80 | 0.80 |
| Lecithin | 0.20 | 0.20 |
|  | 100.00 | 100.00 |

(High-intensity sweetener may be added if desired).

|  | Ex. 5 (inventive) | Ex. 6 (comparative) |
|---|---|---|
| Gum Base of Example 3 | 20.00 | 20.00 |
| Sorbitol | 52.89 | 63.89 |
| Mannitol | 4.00 | 4.00 |
| Glycerin | 5.00 | 5.00 |
| Isomaltulose Oligosaccharide | 11.00 | — |
| Wintergreen Flavor | 1.31 | 1.31 |

-continued

|  | | |
|---|---|---|
| Encapsulated APM | 0.60 | 0.60 |
| Lecithin | 0.20 | 0.20 |
|  | 100.00 | 100.00 |

|  | Ex. 7 (inventive) | Ex. 8 (comparative) |
|---|---|---|
| Gum Base of Example 4 | 21.00 | 21.00 |
| Xylitol | 57.05 | 67.05 |
| Sorbitol Solution (70%) | 5.00 | 5.00 |
| Glycerin | 5.00 | 5.00 |
| Inulin (Raftilin) | 10.00 | — |
| Cinnamon Flavor | 1.20 | 1.20 |
| Encapsulated Acesulfame K | 0.50 | 0.50 |
| Lecithin | 0.25 | 0.25 |
|  | 100.00 | 100.00 |

|  | Ex. 9 | Ex. 10 | Ex. 11 | Ex. 12 | Ex. 13 | Ex. 14 | Ex. 15 |
|---|---|---|---|---|---|---|---|
| Gum Base Ex. #/% | 2/22.00 | 5/23.00 | 6/22.00 | 4/24.00 | 2/25.00 | 2/22.00 | 5/23.00 |
| Sorbitol | 33.25 | 22.35 | 27.05 | 25.19 | 26.96 | 28.65 | 25.55 |
| Mannitol | 5.00 | 4.00 | 4.00 | 6.00 | 4.00 | 5.00 | 6.00 |
| Glycerin | 3.00 | 10.00 | 5.00 | 4.00 | 7.00 | 4.00 | 5.00 |
| Fructooligosaccharide (NutraFlora) | 30.00 | — | — | — | — | — | — |
| FOS Syrup | 5.00 | — | — | — | — | — | — |
| Polydextrose | — | 35.00 | — | — | — | — | — |
| Oligofructose (Raftilose) | — | — | 35.00 | — | — | — | — |
| Isomaltulose Oligosaccharides | — | — | — | 35.00 | — | — | — |
| Indigestible Dextrin (Fibersol) | — | — | — | — | 35.00 | — | — |
| Inulin (Raftilin) | — | — | — | — | — | 35.00 | — |
| Guar Gum Hydrolysate | — | — | — | — | — | — | 35.00 |
| HSH Syrup | — | — | 5.00 | 4.00 | — | — | 4.00 |
| Sorbitol Solution (70%) | — | 4.00 | — | — | — | 4.00 | — |
| Flavor type/level | Peppermint 1.10 | Spearmint 0.95 | Cinnamon 1.20 | Winter-green 1.06 | Sweet Fruit 1.24 | Peppermint 1.05 | Peppermint 1.05 |
| Sweetener type/level | Enc./APM 0.50 | Enc./Free APM 0.50 | Enc. Acesulfame K 0.50 | Enc. APM 0.60 | Enc. APM 0.60 | Sucralose 0.15 | Enc. Sucralose 0.25 |
| Lecithin | 0.15 | 0.20 | 0.25 | 0.15 | 0.20 | 0.15 | 0.15 |

|  | Ex. 16 | Ex. 17 | Ex. 18 | Ex. 19 | Ex. 20 | Ex. 21 | Ex. 22 |
|---|---|---|---|---|---|---|---|
| Gum Base Ex. #/% | 1/24.00 | 4/25.00 | 6/24.00 | 3/26.00 | 3/25.00 | 1/26.00 | 4/24.00 |
| Sorbitol | — | — | — | — | — | — | — |
| Mannitol | 3.00 | 2.00 | — | — | 3.00 | 2.00 | — |
| Glycerin | 4.00 | 4.00 | 5.00 | 5.00 | 4.00 | 5.00 | 8.00 |
| Fructooligosaccharide (NutraFlora) | 61.00 | — | — | — | — | — | — |
| FOS Syrup | 6.00 | — | 6.00 | 7.00 | — | — | — |
| Polydextrose | — | 62.10 | — | — | — | — | — |
| Oligofructose (Raftilose) | — | — | 63.10 | — | — | — | — |
| Isomaltulose Oligosaccharides | — | — | — | 60.30 | — | — | — |
| Indigestible Dextrin (Fibersol) | — | — | — | — | 61.30 | — | — |
| Inulin (Raftilin) | — | — | — | — | — | 59.93 | — |
| Guar Gum Hydrolysate | — | — | — | — | — | — | 66.40 |
| HSH Syrup | — | 5.00 | — | — | — | 6.00 | — |
| Sorbitol Solution (70%) | — | — | — | — | 5.00 | — | — |
| Flavor type/level | Cinnamon 1.10 | Peppermint 1.05 | Spearmint 0.95 | Sweet Fruit 1.30 | Winter-green 1.20 | Spearmint 0.80 | Cinnamon 1.15 |
| Sweetener type/level | Enc./Free Acesulfame K 0.65 | Enc./Free APM 0.65 | Enc./Free APM 0.70 | Enc./Free Alitame 0.10 | Enc./Free Sucralose 0.30 | Enc./Free Alitame 0.12 | Enc./Free Sucralose 0.25 |
| Lecithin | 0.25 | 0.20 | 0.25 | 0.30 | 0.20 | 0.15 | 0.20 |

ENC = encapsulated, referring to sweeteners that are variously encapsulated, as known in the art.
APM = aspartame
Enc./Free - a mixture of encapsulated and nonencapsulated sweetener.

The chewing gums containing binders having at least 35 weight percent oligosaccharides would provide superior chew characteristics and improved processing and manufacture relative to those gums not containing the binders of our invention.

MANUFACTURE AND PROCESSING

The wax-free gum base of the invention constitutes about 10–90 weight percent of the chewing gum, more typically 10–75 weight percent of the chewing gum, and most commonly 20–50 weight percent of the chewing gum. The gum base is typically prepared by adding an amount of the elastomer, elastomer plasticizers and filler to a heated sigma blade mixer with a front to rear blade speed ratio of typically about 2:1. The temperature is normally sufficiently high to melt the final gum base. The initial amounts of ingredients are determined by the working capacity of the mixing kettle in order to attain a proper consistency. After the initial ingredients have massed homogeneously, the balance of the elastomer, or even another elastomer, and the selected plasticizer, filler, softeners, etc. are added in a sequential manner until a completely homogeneous molten mass is attained. This can usually be achieved in from about 30 minutes to about four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making the bubble gum bases of this invention.

First, a majority of elastomer and vinyl polymer and filler are added and blended in a heated sigma blade mixer. Softeners and/or emulsifiers may then be added along with a second portion of each of the selected elastomer or elastomers and filler.

Next, the remainder, if any, of the elastomers and filler are added along with the elastomer plasticizero Finally, the remaining ingredients, such as glycerol monostearate and antioxidants may be added. Colorant may be added at any time during the mixing process and is preferably added at the start. Natural wax, if present, may also be added at any time, but is preferably added after the first elastomer addition.

There are some variations to the above described preferred method which in no way limit the method as described. Those skilled in the art of gum base manufacture may be able to appreciate any minor variations.

In producing petroleum wax-free gum bases high in vinyl polymer, particularly, polyvinyl acetate, and particularly those high in high molecular weight polyvinyl acetate, it is not necessary to improve blending of the ingredients by removing the heat applied to the sigma blade mixer at some point in the process, as is often required with wax-containing gum bases. In the inventive petroleum wax-free gum base process for making the inventive gum base free of petroleum wax, there is reduced need to remove the heat applied, since incompatibility of the vinyl polymer is greatly reduced since there is no petroleum wax present.

In addition to the water-insoluble gum base, a typical chewing gum composition includes a water soluble bulk portion including sweeteners, including high potency sweeteners and bulking sweeteners, and one or more flavoring agents. The wax-free gum base of the invention can be used with any typical chewing gum composition, including bubble gums or specialty gums.

The water-soluble portion of the chewing gum may also include synthetic softeners, bulk sweeteners such as sugars and sugar alcohols, high-intensity sweeteners, flavoring agents and combinations thereof. Softeners are added to the chewing gum in order to optimize the chewability and mouth feel of the gum. The softeners may include glycerin, lecithin, and combinations thereof. Aqueous sweetener solutions such as those containing sorbitol, hydrogenated starch hydrolysates, corn syrup and combinations thereof, may also be used as binding agents in combination with the oligosaccharide binding agents of petroleum wax-free chewing gums.

Chewing gum is generally manufactured by sequentially adding the various chewing gum ingredients to any commercially available mixer known in the art. After the ingredients have been thoroughly mixed, the gum mass is discharged from the mixer and shaped into the desired form, such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with the binders of our invention. The binder components may be added separately, or pre-blended and added together. Further parts of the bulk portion, including sweeteners, may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, including continuous processes may be followed.

We claim:

1. A petroleum wax-free chewing gum, comprising:
   a petroleum wax-free gum base,
   water soluble chewing gum ingredients, and
   about 5–90% by weight of the chewing gum, of a noncariogenic oligosaccharide based binder system which includes at least about 35% of at least one noncariogenic oligosaccharide by weight of the binder system;
   wherein the binder system cuases the chewing gum to at least retain the chew characteristics of a chewing gum having wax.

2. The petroleum wax-free chewing gum of claim 1 wherein the noncariogenic oligosaccharide based binder system comprises at least 35 weight percent of noncariogenic oligosaccharides having an average degree of polymerization of at least 3.

3. The petroleum wax-free chewing gum of claim 2 wherein the noncariogenic oligosaccharides have an average degree of polymerization ranging from about 5 to about 50.

4. The chewing gum of claim 1 wherein the noncariogenic oligosaccharide based binder system comprises at least 35 weight percent noncariogenic oligosaccharides having a degree of polymerization ranging from about 3 to about 50, which oligosaccharides are selected from the group consisting of:
   a) fructooligosaccharides,
   b) indigestible dextrins,
   c) oligofructoses,
   d) polydextroses,
   e) isomaltulose oligosaccharides, or
   f) mixtures thereof.

5. The chewing gum of claim 4 wherein the petroleum wax-free gum base comprises:

| Ingredients | Percent |
| --- | --- |
| a) elastomers | about 10–90 |
| b) elastomer solvent (plasticizer) | about 0–50 |
| c) fats and oils (softeners) | about 1–40 |
| d) fillers/texturizers | about 0.5–40 |
| e) vinyl polymers | about 0.5–40 |
| f) emulsifiers, colorants, synthetic softeners, whiteners, and antioxidants, and | about 0.1–5.0 |
| g) natural waxes | about 0–5. |

6. The chewing gum of claim 5 wherein the water-soluble chewing gum ingredients comprise sweeteners, emulsifiers, and bulking agents, and further wherein the chewing gum comprises oil-soluble flavoring agents, fillers, synthetic softeners and antioxidants.

7. A petroleum wax-free chewing gum comprising:

| Ingredient | Weight % |
| --- | --- |
| a) a petroleum wax-free gum base; | about 10–90% |
| b) a binder system, wherein the binder system comprises at least 35 weight percent of at least one noncariogenic oligosaccharide which is poorly utilized by streptococcus mutans; | about 5–90% |
| c) sweeteners; and | about 0.001–70 |
| d) flavor ingredients; | about 0.01–10 0 | e) wherein the binder system causes the chewing gum to at least retain the chew characteristics of a chewing gum having wax.

8. The gum of claim 7 wherein the binder system is comprised of from 40 weight percent to 100 weight percent of a noncariogenic oligosaccharide selected from the group consisting of fructooligosaccharides, indigestible dextrins, oligofructoses, polydextroses, guar gum hydrolysates, isomaltulose oligosaccharides, hydrolyzed alginates, or mixtures thereof.

9. The gum of claim 7 wherein the binder system contains as the low-calorie oligosaccharide at least one member of the group selected from fructooligosaccharides, indigestible dextrins, oligofructoses, polydextroses, guar gum hydrolysates, hydrolyzed alginates, hydrolyzed gums, and hydrolyzed celluloses, each having an average Degree of Polymerization (DP) of at least 3.

10. The gum of claim 8 wherein the binder system comprises from about 10 weight percent to about 80 weight percent of the gum.

11. The gum of claim 7, 8, or 9 wherein the sweeteners are selected from high-intensity sweeteners, low-intensity sweeteners, or mixtures thereof.

12. The gum of claim 11 wherein the sweeteners are selected from high-intensity sweeteners selected from the group consisting of sucralose, aspartame, stevioside, acesulfame K, alitame, saccharin and its salts, cyclamic acid and its salts, glycyrrhizin, dihydrochalcones, thaumatin, monellin, or mixtures thereof, 13. The gum of claim 7 wherein the wax-free gum base comprises:

| Ingredients | Weight Percent |
| --- | --- |
| a) elastomers | about 10–90 |
| b) elastomer solvent (plasticizer) | about 0–50 |
| c) fats and oils (softeners) | about 1–40 |
| d) fillers/texturizers | about 0.5–40 |
| e) vinyl polymers | about 0.5–40 |
| f) emulsifiers, colorants, synthetic softeners, whiteners, and antioxidants, and | about 0.1–5.0 |
| g) natural waxes | about 0–5. |

14. The gum of claim 13 wherein the wax-free gum bases comprises:

| Ingredients | Weight Percent |
| --- | --- |
| a) elastomers | about 15–75% |
| b) elastomer plasticizer | about 0–40% |
| c) fats and oils | about 5–35% |
| d) fillers/texturizers | about 1.0–30% |
| e) vinyl polymers | about 1.0–30 |
| f) emulsifiers, colorants, synthetic softeners, whiteners, and antioxidants | about 0.5–5.0 |
| g) natural waxes | about 0.0–3.5. |

15. The gum of claim 14 wherein the elastomers are selected from the group consisting of styrene-butadiene copolymers, polyisoprene, polyisobutylene, isobutylene-isoprene copolymer (butyl rubber), natural rubber, chicle, jelutong, balata, guttapercha, lechi caspi, sorva, or mixtures thereof.

16. The gum of claim 15 wherein the elastomers are selected from the group consisting of styrene-butadiene copolymer having a mole ratio of styrene to butadiene ranging between about 2:1 to about 1:2 and a weight average molecular weight ranging from about 10,000 to about 200,000, polyisoprene having a weight average molecular weight ranging from about 10,000 to about 250,000, polyisobutylene having a weight average molecular weight ranging from about 10,000 to about 250,000, isobutylene-isoprene copolymer having a mole ratio of isobutylene to isoprene ranging from about 20:1 to about 1:20 and a weight average molecular weight ranging from about 10,000 to about 250,000, or mixtures thereof.

17. The gum of claim 15 wherein the binder system is present at from about 10 weight percent to about 80 weight percent of the gum, said binder system comprising at least about 40 weight percent of at least one noncariogenic oligosaccharide selected from the group consisting of fructooligosaccharides, indigestible dextrins, oligofructoses, polydextroses, guar gum hydrolysates, isomaltulose oligosaccharides, and hydrolyzed alginates.

18. The gum of claim 16 wherein the binder system is present at from about 10 weight percent to about 80 weight percent of the gum, said binder system comprising at least about 40 weight percent of at least one noncariogenic oligosaccharide selected from the group consisting of fructooligosaccharides, indigestible dextrins, oligofructoses, polydextroses, guar gum hydrolysates, isomaltulose oligosaccharides, and hydrolyzed alginates.

19. The gum of claim 15 wherein the binder system is present at from about 10 weight percent to about 70 weight percent of the gum, said binder system comprising from about 40 weight percent to about 90 weight percent of noncariogenic oligosaccharides selected from the group consisting of fructooligosaccharides, indigestible dextrins, oligofructoses, polydextroses, guar gum hydrolysates, hydrolyzed alginates, isomaltulose oligosaccharides, or mixtures thereof.

20. The gum of claim 16 wherein the binder system is present at from about 10 weight percent to about 70 weight percent of the gum, said binder system comprising from about 40 weight percent to about 90 weight percent of noncariogenic oligosaccharides selected from the group consisting of fructooligosaccharides, indigestible dextrins, oligofructoses, polydextroses, guar gum hydrolysates, hydrolyzed alginates, isomaltulose oligosaccharides or mixtures thereof.

21. A petroleum wax-free chewing gum comprising:

| Ingredient | Weight % |
| --- | --- |
| a) a petroleum wax-free gum base; and | about 15–75.0 |
| b) a binder system, wherein the binder system comprises at least 40 weight percent of at least one noncariogenic oligosaccharide; | about 10–80 |
| c) sweeteners; | about 0.001–50 |
| d) flavor ingradients; | about 0.01–10.0 |
| e) emulsifiers, antioxidants, synthetic softeners, colorants, whiteners, and bulking agents; | about 0.5–25 | f) wherein the binder system causes the chewing gum to at least retain the chew characteristics of a chewing gum having wax.

22. The chewing gum of claim 21 wherein the gum base comprises:

| Ingredients | Weight Percent |
| --- | --- |
| a) elastomers | about 15–65 |
| b) elastomer plasticizer | about 0–40 |
| c) fats and oils | about 1.0–30 |
| d) fillers/texturizers | about 1.0–30 |
| e) vinyl polymers | about 2.0–30 |
| f) emulsifiers, colorants, whiteners, antioxidants | about 0.1–5.0 |
| g) natural waxes | about 0–3.5. |

23. The chewing gum of claim 21 comprising a binder system which comprises from about 40 weight percent to about 90 weight percent of at least one noncariogenic oligosaccharide selected from the group consisting of fructooligosaccharides, indigestible dextrins, oligofructoses, polydextroses, guar gum hydrolysates, isomaltulose oligosaccharides, and hydrolyzed alginates.

24. The chewing gum of claim 22 wherein the binder system comprises from about 40 weight percent to about 90 weight percent of at least one noncariogenic oligosaccharide selected from the group consisting of fructooligosaccharides, indigestible dextrins, isomaltulose oligosaccharides, oligofructoses, polydextroses, guar gum hydrolysates, and hydrolyzed alginates.

25. The chewing gum of claim 21 wherein the sweetener is a high-intensity sweetener present in the gum at from about 0.01 to about 2.0 weight percent.

26. The chewing gum of claim 22 wherein the sweetener is a high-intensity sweetener present in the gum at from about 0.01 to about 2.0 weight percent.

27. The chewing gum of claim 23 wherein the sweetener is a high-intensity sweetener present in the gum at from about 0.01 to about 2.0 weight percent.

28. The chewing gum of claim 24 wherein the sweetener is a high-intensity sweetener present in the gum at from about 0.01 to about 2.0 weight percent.

29. The chewing gum of claim 22 wherein the elastomer plasticizer is present in the gum base within about 0.5 to about 40 weight percent, said plasticizer being selected from at least one of the group consisting of natural rosin esters, glycerol esters of polymerized rosin, glycerol esters of partially hydrogenated rosin, glycerol esters of partially dimerized rosin, glycerol esters of rosin, pentaerythritol esters of partially hydrogenated rosin, methyl and partially hydrogenated methyl esters of rosin, pentaerythritol esters of rosin, and terpene resins derived from alpha-pinene, beta-pinene, and/or d-limonene.

30. The chewing gum of claim 29 wherein the gum base fillers are present within the range of about 2.0 to about 25.0 weight percent and are selected from at least one of the group consisting of calcium carbonate, ground limestone, magnesium silicates, aluminum silicates, silica, alumina, talc, titanium dioxide, mono-, di-, and tri-calcium phosphate, cellulose, and clays.

31. The chewing gum of claim 30 wherein the gum base contains from about 2.0 weight percent to about 30 weight percent of at least one fat, oil or softener selected from the group consisting of tallow, hydrogenated tallow, hydrogenated vegetable oils, partially hydrogenated vegetable oils, cocoa butter, glycerol monostearate, glycerol triacetate, lecithin, mono-, di-, and tri-glycerides, acidulated monoglycerides, and fatty acids selected from the group consisting of stearic acid, palmitic acid, oleic acid, linoleic acid, lauric acid, myristic acid, arachidic acid, linolenic acid, caproic acid, caprylic acid, butyric acid, decenoic acid, gadoleic acid, or mixtures thereof.

32. The chewing gum of claim 31 wherein the vinyl polymers are present within the range of about 0.5 weight percent to about 25 weight percent of the gum base and are selected from at least one of the groups consisting of polyvinylacetate and partially hydrolyzed polyvinylacetate having a weight average molecular weight ranging from about 2,000 to about 100,000, polyvinyl alcohol, polyethylene having a weight average molecular weight ranging from about 2,000 to about 50,000, and copolymers of vinyl acetate and vinyl laurate having a vinyl laurate content of from about 5 to about 50 weight percent of the copolymer and a weight average molecular weight ranging from about 1,000 to about 100,000; and said chewing gum also containing from about 0.1 weight percent to about 3.5 weight percent of at least one natural wax selected from the group consisting of candelilla wax, carnauba wax, ozoberite, oricury, beeswax, rice bran wax, Japan wax and jojoba wax.

33. The chewing gum of claim 21 wherein the sweetener comprises admixtures of at least one high-intensity sweetener and at least one sugar alcohol selected from the group consisting of sorbitol, mannitol, xylitol, maltitol, lactitol, hydrogenated isomaltulose, and hydrogenated starch hydrolysates.

34. The chewing gum of claim 22 wherein the sweetener comprises admixtures of at least one high-intensity low calorie sweetener and at least one sugar alcohol/polyol selected from the group consisting of sorbitol, mannitol, xylitol, maltitol, lactitol, hydrogenated isomaltulose, and hydrogenated starch hydrolysates.

35. The chewing gum of claim 32 wherein the sweetener comprises an admixture of at least one high-intensity, low calorie sweetener and at least one sugar alcohol/polyol selected from the group consisting of sorbitol, mannitol, xylitol, maltitol, lactitol, hydrogenated isomaltulose, and hydrogenated starch hydrolysates.

36. The chewing gum of claim 22 wherein the binder system comprises at least 40 weight percent of indigestible dextrin.

37. The chewing gum of claim 22 wherein the binder system comprises at least 40 weight percent of polydextrose.

38. The chewing gum of claim 22 wherein the binder system comprises at least 40 weight percent of oligofructose.

39. The chewing gum of claim 22 wherein the binder system comprises at least 40 weight percent of isomaltulose oligosaccharides.

40. The chewing gum of claim 22 wherein the binder system comprises at least 40 weight percent of fructooligosaccharides.

41. The chewing gum of claim 22 wherein the binder system comprises at least 40 weight percent of at least a dual combination of oligosaccharides selected from the group consisting of indigestible dextrins, polydextroses, oligofructoses, isomaltulose oligosaccharides, and fructooligosaccharides.

42. The petroleum wax-free chewing gum of claim 22 wherein:
a) the sweetener comprises an admixture of a high-intensity sweetener at least 20 times sweeter than sucrose and at least one sugar alcohol selected from the group consisting of sorbitol, mannitol, xylitol, maltitol, lactitol, hydrogenated isomaltulose, and hydrogenated starch hydrolysate; and
b) the binder system comprises at least one noncariogenic oligosaccharide selected from the group consisting of indigestible dextrins, polydextroses, oligofructoses, isomaltulose oligosaccharides, and fructooligosaccharides, said oligosaccharides or their blends, being present in the binder system at between about 40 weight percent to about 90 weight percent of the total binder system.

43. A petroleum wax-free chewing gum comprising:

| Ingredients | Weight % |
| --- | --- |
| a) wax-free gum base | 20–50 |
| b) a binder system comprising at least 35 weith percent of the binder system of noncariogenic oligosaccharides | 10–50 |
| c) sweeteners | 0.005–50 |
| d) flavors, and | 0.5–5.0 |
| e) optional ingredients, selected from the group consisting of: | 0.1–40 |
| synthetic softeners | 0.1–20 |
| fillers | 0.0–30 |
| emulsifiers | 0.0–2 |
| colorants & dyes | 0.0–1.0 |
| antioxidants | 0.0–1.0 |
| non-sweet bulking agents | 0.0–39 |
| flavor enhancers | 0.0–2.0 |
| food acidulants | 0.0–3.0 |

| Ingredients | Weight % |
| --- | --- |
| medicinals/pharmaceuticals | 0.0–2.5 | f) wherein the binder system causes the chewing gum to at least retain the chew characteristics of a chewing gum having wax.

44. The gum of claim 43 wherein the gum base comprises:

| Ingredients | Weight % |
| --- | --- |
| a) elastomers | 20–50 |
| b) elastomer plasticizer | 10–50 |
| c) fats and oils | 5–30 |
| d) vinyl polymers | 5–30 |
| e) fillers | 5–25 |
| f) emulsifiers, antioxidants, dyes colors, whiteners, softeners | 0.1–10 |
| g) natural waxes | 0.0–3.5 |

45. The petroleum wax-free gum of claim 43 wherein:
a) the wax-free gum base comprises synthetic elastomers selected from the group consisting of:
  1) styrene-butadiene copolymers having a styrene to butadiene mole ratio between about 3:1 to about 1:3 and a weight average molecular weight ranging between about 10,000 and 80,000;
  2) polyisoprene having a weight average molecular weight between about 10,000 and 85,000;
  3) polyisobutylene having a weight average molecular weight between about 10,000 and 90,000;
  4) isobutylene-isoprene copolymer having a weight average molecular weight of between about 10,000 and 90,000; and
  5) mixtures thereof; and further
b) the wax-free gum base further comprises vinyl polymers selected from polyvinyl acetate having a weight average molecular weight between about 10,000 and about 100,000, vinyl acetate-vinyl laurate copolymers having a vinyl laurate weight percent ranging from 5–50% and a weight average molecular weight ranging between about 10,000–75,000, or mixtures thereof; and
c) the wax-free gum base further comprises elastomer plasticizers selected from the group consisting of:
  1) glycerol esters of hydrogenated rosin;
  2) glycerol esters of partially hydrogenated rosin;
  3) glycerol esters of polymerized rosin;
  4) glycerol esters of rosin;
  5) glycerol esters of dimerized or partially dimerized esters;
  6) pentaerythritol esters of rosin;
  7) pentaerythritol esters of partially hydrogenated rosin;
  8) pentaerythritol esters of hydrogenated rosin;
  9) methyl esters of rosin;
  10) partially hydrogenated methyl esters of rosin;
  11) terpene resins derived form α-pinene, α-pinene and/or d-limonene; and
  12) any admixture thereof; and
d) the wax-free gum base further comprises fillers selected from the group consisting of:
  1) magnesium oxide, hydroxide, carbonate, or mixtures thereof;
  2) calcium oxide, hydroxide, carbonate, or mixtures thereof;

3) limestone;
4) magnesium silicate;
5) aluminum silicate;
6) calcium silicate;
7) clays;
8) alumina;
9) silica;
10) talc;
11) titanium dioxide;
12) mono-, di-, and/or tri-calcium phosphate;
13) cellulosics; and
14) any combination thereof; and e) the wax-free gum base further comprises fats, oils, and softeners selected from the group consisting of:
1) tallow;
2) hydrogenated tallow;
3) vegetable oils;
4) partially hydrogenated vegetable oils;
5) hydrogenated vegetable oils;
6) cocoa butter;
7) glycerol monostearate;
8) glycerol triacetate;
9) lecithin;
10) mono-, di-, and/or tri-glycerides;
11) acetylated monoglycerides;
12) fatty acids and/or their methyl/ethyl esters; or
13) any admixture thereof; and f) the wax-free chewing gum further comprises the wax-free gum base in combination with a noncariogenic oligosaccharide containing binder system having from about 40 weight percent to 100 weight percent oligosaccharides selected from the group consisting of:
1) fructooligosaccharides;
2) indigestible dextrins;
3) oligofructoses;
4) polydextroses;
5) isomaltulose oligosaccharides; or
6) any mixtures thereof; and g) the wax-free chewing gum further comprises sweeteners selected from the group consisting of:
1) sucralose;
2) aspartame;
3) stevioside;
4) acesulfame K;
5) alitame;
6) saccharin, and its salts;
7) cyclamic acid, and its salts;
8) glycyrrhizin;
9) dihydrochalcones;
10) thaumatin;
11) monellin;
12) sucrose;
13) glucose;
14) fructose;
15) maltose;
16) dextrin;
17) invert sugar;
18) levulose;
19) galactose;
20) corn syrup solids;
21) sorbitol;
22) mannitol;
23) xylitol;
24) hydrogenated starch hydrolysates;
25) maltitol; or
26) any admixture thereof.

46. The chewing gum of claim 45 further comprising from 0.1 to about 5.0 weight percent natural waxes selected from the group consisting of:
1) candelilla wax;
2) carnauba wax;
3) ozoberite;
4) oricury;
5) beeswax;
6) rice bran wax;
7) Japan wax;
8) jojoba wax; or
9) mixtures thereof.

47. A method of manufacturing a petroleum wax-free chewing gum which comprises sequentially blending gum base ingredients, in a selected sequence, into a molten homogeneous mass, and then
a) optionally casting into a desired shape, cooling to solidify and collecting a shaped gum base; or b) then sequentially admixing the molten homogeneous mass with various water soluble chewing gum portions including noncariogenic oligosaccharides, blending for a sufficient time to obtain a molten chewing gum and then discharging the molten chewing gum, extruding or shaping and cooling same, thereby forming a shaped petroleum wax-free chewing gum containing noncariogenic oligosaccharides based binder system;
c) wherein the binder system causes the chewing gum to at least retain the chew characteristics of a chewing gum having wax.

48. A method of manufacturing a petroleum wax-free chewing gum which comprises:
a) blending at a temperature sufficient to maintain a molten state, in any order, the following ingredients:

| Ingredients | Weight % |
| --- | --- |
| a) elastomers | about 10–90% |
| b) elastomer plasticizers | about 0–50% |
| c) fats, oils and softeners | about 1–40% |
| d) fillers/texturizers | about 0.5–40% |
| e) vinyl polymers | about 0.5–40% |
| f) natural waxes | about 0.0–5% | in a mixer designed and equipped to manufacture chewing gum base; and then
b) mixing said ingredients for a sufficient time to obtain a molten homogeneous mass then cooling and casting to obtain a shaped gum base; and then
c) mixing the gum base at a temperature sufficient to at least soften the gum base, and then mixing with, in any order, water soluble chewing gum ingredients including a noncariogenic oligosaccharide based binder system, thereby obtaining a molten, dough-like, petroleum wax-free chewing gum mixture, and then adding thereto and mixing therewith selected flavoring agents to obtain a flavored molten dough-like chewing gum; and then
d) discharging the flavored gum of (c) into shaping devices, cooling, and recovering said petroleum wax-free chewing gum;
e) wherein the binder system causes the chewing gum to at least retain the chew characteristics of a chewing gum having wax.

49. The method of claim 48 wherein the water-soluble chewing gum ingredients comprise:

| Ingredients | Wt % |
|---|---|
| a) Sweeteners | about 0.001–70% |
| b) Binder System | about 5.0–90% | and further wherein the chewing gum contains flavoring agents from about 0.01–10%.

50. The method of claim 49 wherein the sweeteners are selected from high-intensity sweeteners, low-intensity sweeteners, or mixtures thereof; and further wherein the binder system comprises at least 35 weight percent, by weight of the total binder system, of noncariogenic oligosaccharides.

51. The method of claim 50 wherein the noncariogenic oligosaccharides are selected from at least one oligosaccharide from the group;
 a) fructooligosaccharides,
 b) indigestible dextrins,
 c) oligofructoses,
 d) polydextroses,
 e) guar gum hydrolysates,
 f) isomaltulose oligosaccharides,
 g) hydrolyzed alginates,
 h) hydrolyzed gums,
 i) hydrolyzed celluloses and modified celluloses; or
 j) mixtures thereof; and further wherein, the oligosaccharides have an average degree of polymerization of at least 3.

* * * * *

UNITED STATES PATENT AND TRADEMARK OFFICE
CERTIFICATE OF CORRECTION

PATENT NO. : 5,342,631
DATED : August 30, 1994
INVENTOR(S) : Robert J. Yatka et al.

It is certified that error appears in the above-indentified patent and that said Letters Patent is hereby corrected as shown below:

Col. 18, line 45, delete "cuases" and substitute --causes--.

Column 21, line 29, delete "ingradients" and substitute --ingredients--.

Column 23, line 55, delete "weith" and substitute --weight--.

Column 24, line 19, after "dyes" insert --,--.

In the Claims

Column 24, line 60, delete "form" and substitute --from--.

Column 24, line 60, delete the second occurrence of "α" and substitute --β--.

Signed and Sealed this

Twelfth Day of November, 1996

Attest:

BRUCE LEHMAN

Attesting Officer     Commissioner of Patents and Trademarks